United States Patent
Ricci et al.

(10) Patent No.: US 10,274,128 B2
(45) Date of Patent: Apr. 30, 2019

(54) ADAPTER ASSEMBLY FOR MOUNTING A DISPLAY

(71) Applicant: SCHNEIDER ELECTRIC USA, INC., Andover, MA (US)

(72) Inventors: Marc Alan Ricci, Victoria (CA); Stewart John Harding, Victoria (CA)

(73) Assignee: SCHNEIDER ELECTRIC USA, INC., Andover, MA (US)

(*) Notice: Subject to any disclaimer, the term of this patent is extended or adjusted under 35 U.S.C. 154(b) by 323 days.

(21) Appl. No.: 15/215,703

(22) Filed: Jul. 21, 2016

(65) Prior Publication Data

US 2018/0027678 A1  Jan. 25, 2018

(51) Int. Cl.
  *G01D 11/30* (2006.01)
  *F16M 13/02* (2006.01)
  *H05K 5/00* (2006.01)

(52) U.S. Cl.
  CPC .......... *F16M 13/02* (2013.01); *H05K 5/0017* (2013.01)

(58) Field of Classification Search
  CPC .. B60R 11/0235; G01D 11/305; H02B 1/044; H05K 5/0017
  USPC ...................................................... 248/27.1
  See application file for complete search history.

(56) References Cited

U.S. PATENT DOCUMENTS

| | | | | |
|---|---|---|---|---|
| 2,745,275 A * | 5/1956 | Jacobi | ................. | G01D 11/305 248/27.1 |
| 3,830,454 A * | 8/1974 | Debaigt | .................... | F16B 5/02 248/27.1 |
| 3,871,606 A * | 3/1975 | Larson | ................. | G01D 11/305 248/27.1 |
| 4,440,368 A * | 4/1984 | Kitchen | .................... | G12B 9/00 248/27.1 |
| 5,410,373 A * | 4/1995 | Sagues | ................... | H04N 5/645 248/27.1 |
| 6,446,913 B1 * | 9/2002 | Schroeder | ................ | F16B 1/00 248/222.52 |
| 6,938,859 B2 * | 9/2005 | Beausoleil | ............... | G12B 9/08 248/27.1 |
| 7,300,024 B2 * | 11/2007 | Slatosch | ............. | B60R 11/0235 248/27.1 |
| 7,639,508 B2 * | 12/2009 | Hauser | ................ | H05K 5/0204 361/759 |
| 7,708,233 B2 * | 5/2010 | Tannas, Jr. | ............. | B60K 35/00 248/27.1 |
| 7,780,135 B2 * | 8/2010 | Nelson | .................. | H04R 1/025 181/150 |
| 7,881,075 B2 * | 2/2011 | Farago | ................... | H02B 1/044 361/801 |

(Continued)

*Primary Examiner* — Bradley Duckworth
(74) *Attorney, Agent, or Firm* — Lando & Anastasi, LLP

(57) ABSTRACT

An adapter assembly is used to secure a base unit and a display unit to a panel, with the base unit including a housing, the panel including an opening formed in the panel, and the display unit including a body. The adapter assembly includes an adapter disposed between the base unit and the panel. The adapter includes a primary wall. One of the display unit and the adapter includes a formation that extends from the body of the display unit or the primary wall of the adapter, and the other of the display unit and the adapter includes a mechanism configured to engage and secure the display unit to the panel without disturbing a securement of the base unit to the adapter.

12 Claims, 6 Drawing Sheets

(56) References Cited

U.S. PATENT DOCUMENTS 9,632,112 B2 * 4/2017 Harding ............... G01R 22/065
2007/0131520 A1 * 6/2007 Saunders ............... B65G 21/00
198/502.1

* cited by examiner

ADAPTER ASSEMBLY FOR MOUNTING A DISPLAY

FIELD OF THE INVENTION

The present disclosure relates generally to door-mounted displays, and more particularly to an adapter assembly having a back-to-back adapter that enables a display to be installed or replaced without having to remove a power meter mounted on a door.

BACKGROUND

A basic functionality of a power meter is to measure one or more characteristics of electricity, such as current or voltage. A power meter can be attached to a DIN rail or mounted through a cutout to a door of an electrical enclosure for power monitoring equipment. A power meter can conventionally include connectors accessible from within the electrical enclosure for making connections to the power meter, including power supply, I/O, voltage inputs, current inputs, and communications.

A variety of mechanisms exist today for mounting a remote display unit to an electrical panel or door, but many of these mechanisms can make installation awkward for one person tasked with installing the display unit. Newer methods ease installation for one person, but typically assume that only the display unit is installed on the face of the panel or door. One challenging configuration involves the installation of the display unit on the face of the electrical enclosure panel and a meter base unit on the other side of the panel, directly behind the display unit. Once installed, replacement of the display unit requires first removing the meter base unit, typically requiring powering down the meter and safely isolating voltage and current inputs, often requiring disconnection of many of the aforementioned connectors.

SUMMARY

One aspect of the present disclosure is directed to an adapter assembly used to secure a base unit and a display unit to a panel, with the base unit including a housing, the panel including an opening formed in the panel, and the display unit including a body. In one embodiment, the assembly comprises an adapter disposed between the base unit and the panel. The adapter includes a primary wall. One of the display unit and the adapter includes a formation that extends from the body of the display unit or the primary wall of the adapter, and the other of the display unit and the adapter includes a mechanism configured to engage and secure the display unit to the panel without disturbing a securement of the base unit to the adapter.

Embodiments of the adapter assembly further may include the formation having a cylindrical formation extending from the body of the display unit. The mechanism may include a speed nut. The mechanism may include a gear mechanism associated with the adapter, with the gear mechanism including a release gear that engages the speed nut. The speed nut may include a circular body having an inner hub with a large central opening and an outer periphery having teeth formed thereon. The cylindrical formation may include includes a threaded outer surface to threadably engage the gear mechanism to secure the display unit to the adapter. The release gear may include a body having a centrally located opening formed in the body and teeth formed on an outer periphery of the body that mesh with the teeth of the speed nut to drive the rotation of the speed nut when the release gear is rotated. The release gear may extend through an aperture formed in a side wall of the adapter to enable access of the release gear. The body of the speed nut further may include a plurality of inwardly projecting threaded portions and a plurality of inwardly projecting fingers positioned between the threaded portions. Each threaded portion of the plurality of threaded portions may include a threaded end that threadably engages the threaded cylindrical formation, and the plurality of threaded portions and the plurality of fingers may be positioned equidistant from each other, with a small space provided in between an adjacently positioned threaded portion and finger. The threaded portions and the fingers further may enable the cylindrical formation of the display unit to be inserted into the speed nut to a position in which the threaded portions fully or nearly fully engage the threads of the speed nut to secure the display unit in place. The adapter may include an anti-rotation pin on the adapter that is received within an opening formed in the display unit to align the display unit on the panel and prevent the display unit from rotating when the speed nut is tightened.

Another aspect of the present disclosure is directed to a method of assembling a base unit and a display unit to a panel. In one embodiment, the method comprises: providing an adapter and securing the adapter to the panel; securing the base unit to a rear of the panel by the adapter; and securing the display unit to a front of the panel by the adapter. The display can be locked in place or removed only by access to the rear of the panel.

Embodiments of the method further may include removing the display unit and replacing the display unit without removing the base unit from the adapter. The adapter may include a primary wall and a gear mechanism configured to secure the display unit to the panel, and the display unit may include a cylindrical formation configured to threadably engage the gear mechanism. The gear mechanism may include a speed nut having a circular body with an inner hub with a large central opening and an outer periphery having teeth formed thereon. The gear mechanism further may include a release gear that engages the speed nut. The release gear may include a body having a centrally located opening formed in the body and teeth formed on an outer periphery of the body that mesh with the teeth of the speed nut to drive the rotation of the speed nut when the release gear is rotated. The inner hub may have a threaded portion that is configured to threadably engage the cylindrical formation to secure the display unit. The body of the speed nut further may include a plurality of inwardly projecting threaded portions and a plurality of inwardly projecting fingers positioned between the threaded portions, and each threaded portion of the plurality of threaded portions may include a threaded end that threadably engages the threaded cylindrical formation, the plurality of threaded portions and the plurality of fingers being positioned equidistant from each other, with a small space provided in between an adjacently positioned threaded portion and finger.

BRIEF DESCRIPTION OF THE DRAWINGS

The accompanying figures are not intended to be drawn to scale. In the figures, each identical or nearly identical component that is illustrated in various figures is represented by a like numeral. For purposes of clarity, not every component may be labeled in every figure. In the figures.

DETAILED DESCRIPTION

Figure 1:
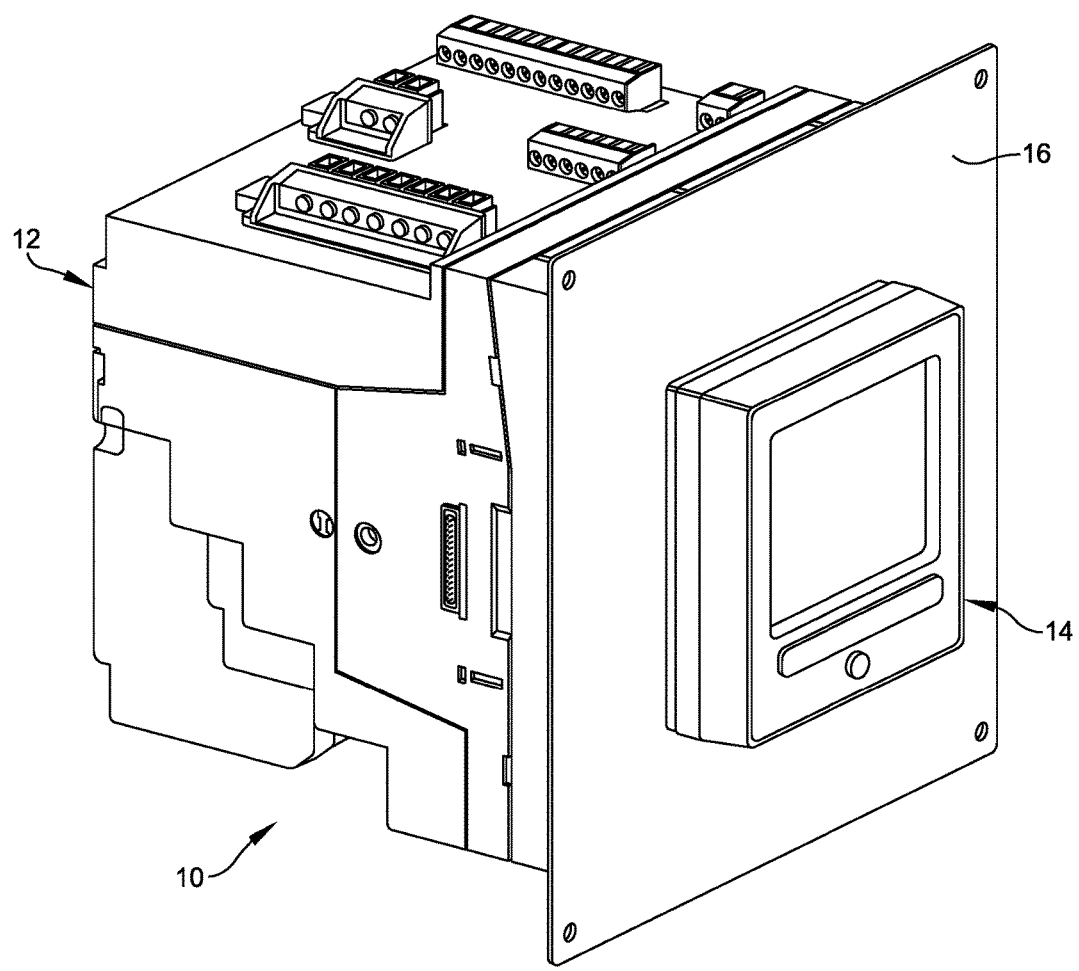
FIG. 1 is a front perspective view of an adapter assembly of an embodiment of the present disclosure capable of securing a meter base unit and a display to a panel.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. In addition, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of an adapter assembly configured to secure a meter base unit to a panel, such as a door panel, and a remote display unit that can be installed or replaced without disturbing an already installed meter base unit. The adapter assembly includes, among other things, a unique speed nut design that eases installation for a single person, allowing the remote display unit to be first pushed securely into place from the front of the panel and then tightened into place from behind the panel door. The adapter assembly further enables the display unit to be released and removed, without disturbing the manner in which the meter base unit is secured to the panel.

Particular embodiments of the adapter assembly includes an adapter that enables a base unit (e.g., a power meter) to be mounted to a front panel of an enclosure and enables a remote display (RMD) to be easily mounted and replaced without removal of the base unit. The use of the back-to-back adapter enables easy and quick installation and replacement of the RMD. This is advantageous as the RMD may be replaced over the life of the meter base unit for upgrading to new technology or for replacement due to wearing or failure of the RMD. The adapter assembly can also satisfy an integrated meter requirement by enabling packaging of the RMD and the meter base unit as one "integrated" assembly. As discussed above, the design of the adapter assembly has an innovative speed nut design that allows the installer to easily assemble the RMD to the adapter assembly by simply pushing the RMD onto the adapter assembly. In one embodiment, the adapter assembly has a gear mechanism that allows for the RMD to be tightened and sealed to the adapter assembly, without having to disconnect or remove the meter base unit from the adapter assembly. The construction of the adapter assembly enables the RMD to be replaced in under two minutes with no tools and without disturbing the meter base unit.

Embodiments of the adapter assembly further include the gear mechanism having a spur gear design, but could function with a worm gear configuration that would allow the installer to use a screw driver or a socket to tighten and loosen the RMD instead of a hand/finger. In an alternate design, one larger gear around the speed nut is designed such that the gear extends outside of the adapter at one end, allowing the gear to be rotated by hand.

In one embodiment, an anti-rotation pin on the RMD is received in an opening in the panel and the adapter of the adapter assembly to align the display unit on the panel and prevent the display unit from rotating when the speed nut is tightened. In another approach, four recessed holes on the display unit mate with four screw heads inserted through the panel door and are used to mount the adapter assembly to the panel door, which prevents the display unit from rotating when the speed nut is tightened. In yet another approach, the opening in the panel can be D-shaped to engage a D-shaped mounting formation on the RMD to prevent unwanted rotation.

Further embodiments of the assembly include sealing locations on the adapter assembly, such as a point used to lock the exposed thumb gear (with a wire seal) that engages with the speed nut, which enables the meter base unit, the adapter assembly, the panel and the display unit to be sealed. A cable connecting the display unit to the meter base unit is routed through a recess in the adapter assembly to allow the connection to occur without exposing the cable, which is advantageous for the purpose of sealing of the complete unit.

The purpose of sealing is to provide evidence of tampering. Seals are typically small thin sections of wire or plastic that are looped through features in a device. The ends of the seal are connected in such a way that they cannot be disconnected without being broken. Also, if the seal breaks, it is designed such that the ends cannot be reconnected. The seal itself may also carry a unique identification number so that it cannot be replaced. Tamper resistance (or evidence of tampering) is important for a variety of different applications.

Once the meter base unit, the adapter assembly, and the RMD are fully assembled to a panel, there are a few different levels (types) of seals that can be placed on the assembly with different functions. For example, points can function as release mechanisms that normally stay closed to lock the meter base the to the adapter assembly. These points can be sealed to prevent the meter base unit from being detached (uninstalled) from the adapter assembly. A release gear of the adapter assembly can be sealed in such a manner so as to prevent rotation of the release gear, which results in preventing the RMD from being removed or otherwise uninstalled. This arrangement locks the RMD to the adapter assembly. It should be noted that screws provided to fasten the adapter assembly to the panel are normally covered by the RMD. Thus, if the RMD is sealed, then the adapter assembly is sealed to the panel. With these two seals in place, the adapter assembly cannot be taken apart or removed from the panel. The meter base unit also contains three additional levels of seals. The seals lock the terminal covers to the meter base unit, a seal to lock the meter base unit together, and a seal to lock access to a switch that puts the meter base unit in a software configuration mode.

The speed nut design also may include centering posts or fingers between the teeth that help center the display unit as the threaded mounting formation from the RMD as the RMD is secured to the adapter assembly. This centering action helps to ensure the speed nut teeth are loaded equally when the speed nut is ratcheted over the threaded mounting formation extending from the RMD. The centering fingers also provide mechanical support to keep the threaded mounting formation centered in the speed nut in case some teeth become weakened over time or broken.

Referring now to the drawings, and more particularly to FIG. 1, an adapter assembly is generally indicated at 10. As shown, the adapter assembly 10 is configured to secure a base unit, generally indicated at 12, such as a power meter or some other electronic device, and a display unit, generally indicated at 14, such as an RMD having an LCD, to a panel 16, such as a door panel. In one embodiment, the assembly is configured to attach the base unit 12 and the display unit 14 to the panel 16 (e.g., a door panel) of an enclosure, such as an equipment rack or enclosure, which is configured to support electronic equipment, such as servers, electrical distribution devices, communication, and related gear.

Figure 2:
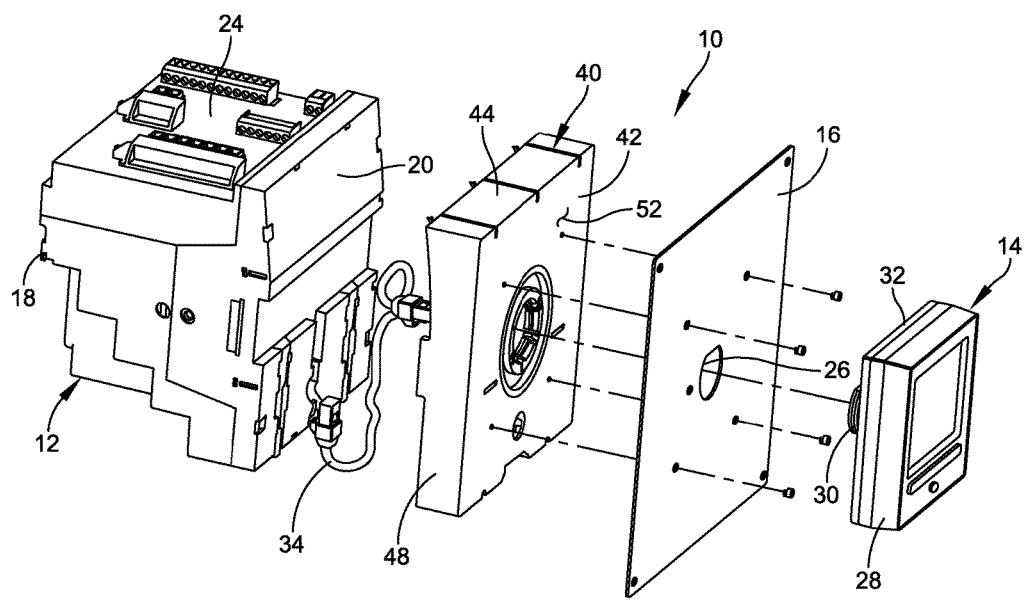
FIG. 2 is a front exploded perspective view of the adapter assembly, the meter base unit and the display.
Figure 3:
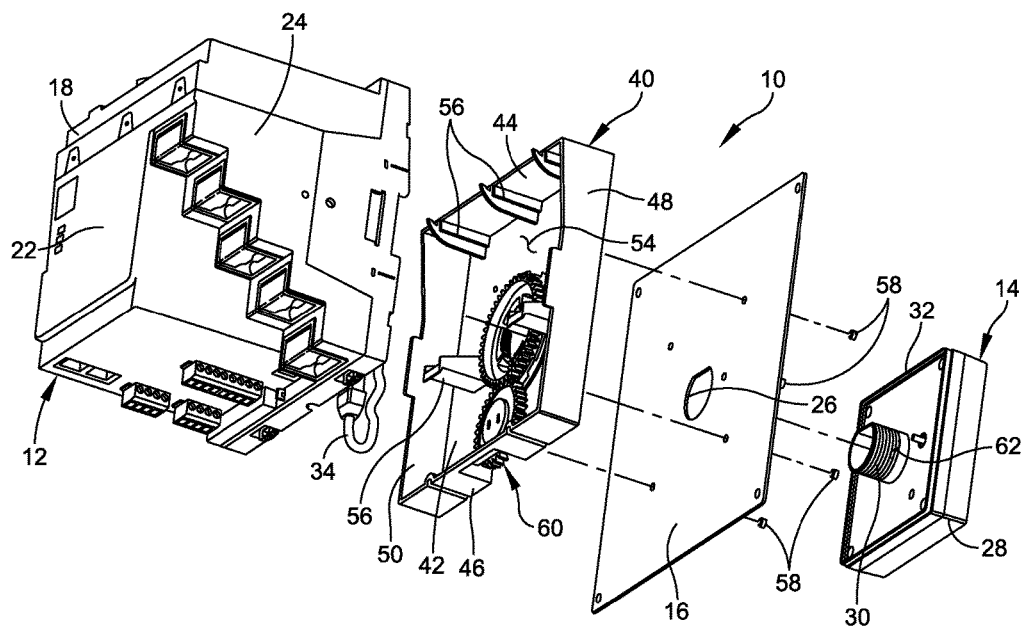
FIG. 3 is a back exploded perspective view of the adapter assembly, the meter base unit and the display.

Referring to FIGS. 2 and 3, the base unit 12 is generally box-shaped in construction, and can include a housing generally indicated at 18 that supports many components of the base unit. The housing 18 of a base unit 12 has a bottom 20, a top 22, and a side 24 connected to the bottom and the top, with the housing defining an interior volume. In one embodiment, as mentioned above, the base unit 12 is a power meter, which can conventionally include connectors accessible from the top 22 or the sides 24 of the housing 18 of the power meter for making connections to the power meter, including power supply, input/output connectors, voltage inputs, current inputs, and communications. The base unit 12 further includes a controller. The electronic components in the base unit 12, including the controller, can be provided on one or more printed circuit boards or backplanes. The controller is coupled to a number of interfaces that enable communication with various systems external to the base unit 12. For example, the controller can be coupled to a communication interface that is coupled to a power monitoring and control system. The base unit 12 can also be configured to support other components, such as anti-tamper rivets. The base unit 12 can be additionally installed on a DIN rail (not shown), with a much longer cable connecting it to the RMD, which can be installed directly to a panel. In this configuration, the meter base unit 12 and the RMD do not require the adapter assembly 10.

The adapter assembly 10 enables the display unit 14 to be easily mounted and replaced by a single person without removal of the base unit 12. In some embodiments, the panel 16 may be fabricated from perforated metal or may be configured to include an opening 26 formed in the panel to facilitate the attachment of the display unit 14. In one embodiment, the display unit 14 includes a generally rectangular-shaped body 28 and a generally cylindrical-shaped threaded formation 30 that extends from the body through the opening 26 formed in the panel 16. The body 28 of the display unit 14 includes a gasket 32 provided along a periphery of the body to prevent dust and water from getting behind the display unit and into the panel 16 once assembled. The controller of the base unit 12 can also be coupled to an interface of the display unit 14 by a connector cable 34.

Figure 5:
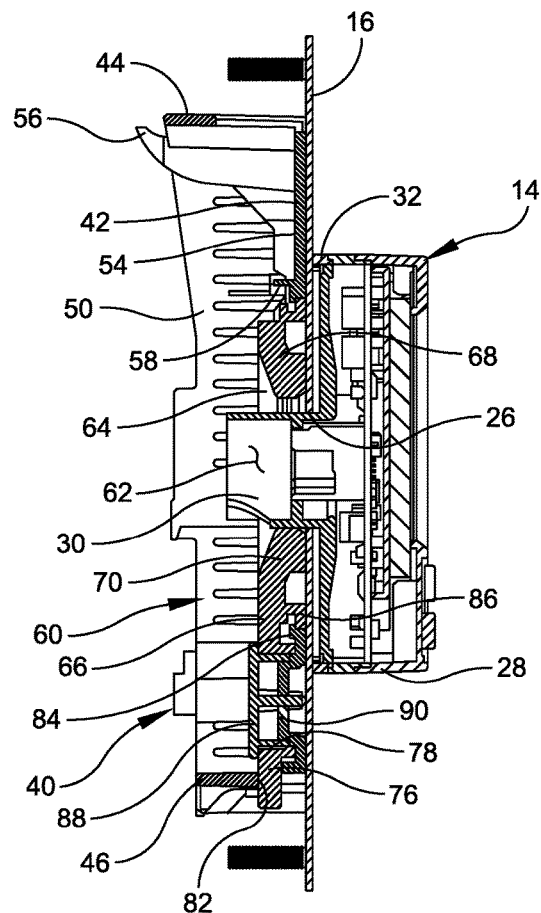
FIG. 5 is a vertical cross-sectional view of the adapter assembly and the display.

The adapter assembly 10 includes a back-to-back adapter, generally indicated at 40, that is disposed between the base unit 12 and the panel 16. In a certain embodiment, the adapter 40 is generally square-shaped in construction, having a primary, vertical wall 42 and four side walls 44, 46, 48, 50 that extend generally perpendicularly from the primary wall toward the base unit 12. As shown, the primary wall 42 includes a front surface 52 that faces the panel 16 and a back surface 54 that faces the base unit 12. The front surface 52 is flat in construction so that the adapter 40 lies flat against the panel 16 when mounting the adapter on the panel. The back surface 54 of the primary wall 42 of the adapter 40 includes several features, each indicated at 56, that project away from the back surface toward the base unit 12 to assist in positioning and securing the base unit to the adapter. Several fasteners, each indicated at 58, are provided to secure the adapter 40 to the panel 16. As will be described in greater detail below, in addition to securing the base unit 12 to the panel 16, the adapter 40 is configured to secure the display unit 14 to the panel as well. In one embodiment, the base unit 12 is secured to the adapter 40 by first hanging the base unit on hooks (feature(s) 56; FIG. 5), and then swinging the base unit down to engage and latch two locking mechanisms on their respective hooks (FIG. 3) of the adapter.

Figure 4:
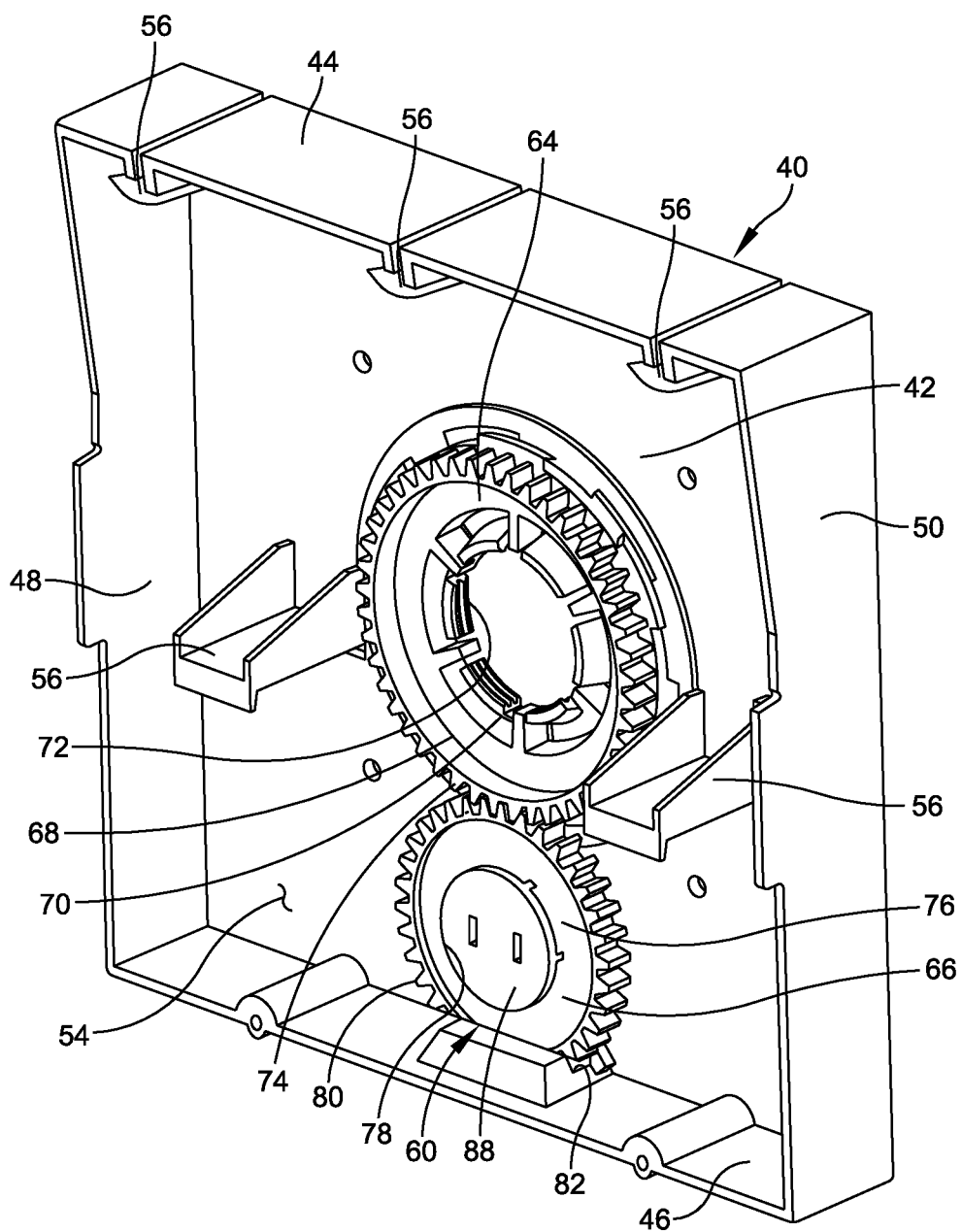
FIG. 4 is a back perspective view of the adapter assembly.

Referring additionally to FIG. 4, the adapter 40 of the adapter assembly 10 includes a gear mechanism, generally indicated at 60, that is used to secure the display unit 14 to the adapter so that the display unit engages the panel 16. The cylindrical formation 30 of the display unit 14 includes a threaded outer surface 62 to threadably engage the gear mechanism 60 to secure the display unit 14 to the adapter 40. In another embodiment, the cylindrical formation can be associated with the adapter 40 of the adapter assembly 10 and the gear mechanism can be associated with the display unit 14. The gear mechanism 60 includes a larger speed nut 64 and a smaller release gear 66 that engages the speed nut. Specifically, the speed nut 64 includes a circular body 68 having an inner hub 70 with a large central opening 72 sized to receive and threadably engage the cylindrical formation 30 of the display unit 14. The body 68 of the speed nut 64 further has an outer periphery 74 having teeth formed thereon. As shown, the release gear 66 includes a circular body 76 having a centrally located opening 78 formed in the body. The body 76 of the release gear 66 further has an outer periphery 80 having teeth formed thereon, with the teeth of the release gear meshing with the teeth of the speed nut 64. In one embodiment, the teeth of the speed nut 64 and the teeth of the release gear 66 mesh as spur gears would mesh. As shown in FIG. 4, the release gear 66 extends through an aperture 82 formed in the side wall 46 of the adapter 40 at the interface of the side wall and the primary wall 42. The arrangement is such that a person installing the display unit 14 to the adapter 40 of the assembly 10 can secure the display unit by manipulating the release gear 66, which in turn rotates the speed nut 64 to further secure the cylindrical formation 30 of the display unit. Removal of the display 14 is accomplished by manipulating the release gear 66 in the opposite direction used during installation.

Figure 6:
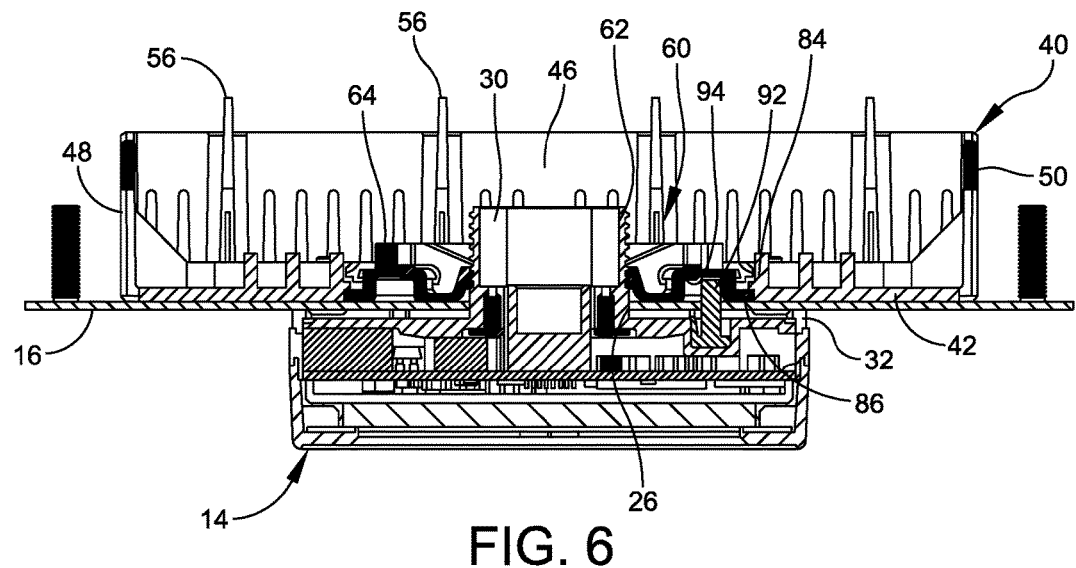
FIG. 6 is a horizontal cross-sectional view of the adapter assembly and the display.

Referring to FIGS. 5 and 6, the cylindrical formation 30 of the display unit 14 extends through the opening 26 in the panel 16 prior to being secured to the adapter 40, and is threadably secured to the speed nut 64. As shown, once secured, the gasket 32 of the display unit 14 engages the panel 16 thereby preventing water and dust from entering the panel through any of the mounting holes of the panel. The speed nut 64 of the gear mechanism 60 is held in place by a feature 84 associated with the primary wall 42 of the adapter 40. Specifically, the feature 84 engages a flange 86 of the speed nut 64 to hold the speed nut in place against the primary wall 42 of the adapter 40. In one embodiment, the flange 86 of the speed nut 64 is snap fit in place within the feature 84. The speed nut 64 is configured to rotate relative to the primary wall 42 of the adapter 40. Once the adapter 40 is installed to the panel 16, the speed nut 64 is also trapped by the panel such that the speed nut cannot fall out of position.

The release gear 66 is held in place by a truncated shaft portion 88 that extends through the central opening 78 of the release gear. The shaft portion 88 is secured in place relative to the adapter 40 by another feature 90 associated with the primary wall 42 of the adapter in which the shaft portion is snap fit in place within this feature. The release gear 66 is configured to rotate about the shaft portion 88. As shown in FIG. 5, the release gear 66 extends through the aperture 82 formed in the side wall 46 to enable an operator installing the display unit 14 to access the release gear.

With particular reference to FIG. 6, the display 14 includes an anti-rotation pin 92 that is received within an opening formed in the panel 16 as well as an opening formed in the adapter 40 to align the display unit on the panel 16 and prevent the display unit from rotating when the speed nut 64 is tightened. The anti-rotation pin 92 ensures that the display unit 14 does not rotate when firmly securing the display unit to the adapter 40 by rotating the release gear 66 and the speed nut 64. In another embodiment, four recessed holes provided on the body 28 of the display unit 14 mate with four screw heads inserted through the panel 16 that are used to mount the adapter 40 to the panel. The insertion of the screw heads into the recessed holes prohibits the display unit 14 from rotating when the speed nut 66 is tightened by the release gear 66. In another embodiment, a D-shaped opening in the panel 16 may be provided to mate with a D-shaped threaded formation 30 extending from the display 14, thereby preventing unwanted rotation of the display.

Figure 7:
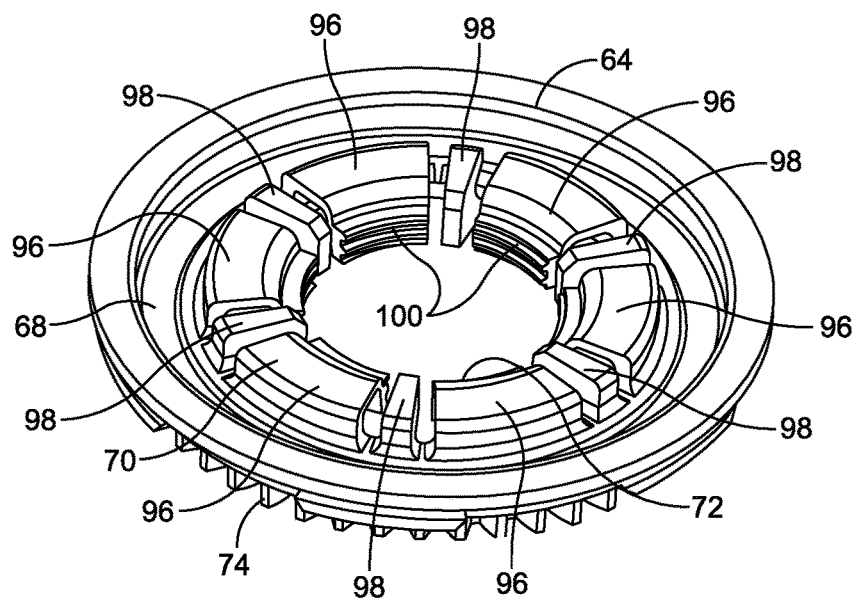
FIG. 7 is a perspective view of a speed nut of the adapter assembly.
Figure 8:
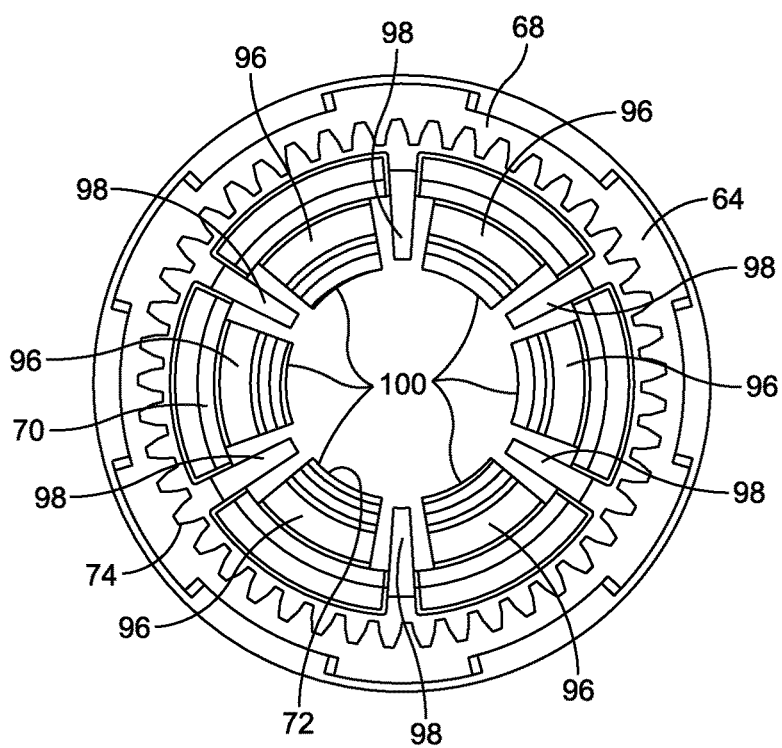
FIG. 8 is a front view of the speed nut.

Referring additionally to FIGS. 7 and 8, the speed nut 64 is constructed to accurately position the speed nut with respect to the cylindrical formation 30 of the display unit 14 to properly center the cylindrical formation within the opening 72 of the speed nut. In one embodiment, the body 68 of the speed nut 64 further includes six inwardly projecting threaded portions, each indicated at 96, and six inwardly projecting fingers, each indicated at 98, positioned between the threaded portions. Although the speed nut 64 is configured to include six threaded portions 96 and six fingers 98, any number of threaded portions and fingers may be provided to center the speed nut with respect to the cylindrical formation 30 of the display unit 14. The threaded portions 96 each include a threaded end 100 (female threads) that threadably engages the threaded cylindrical formation 30 (male threads) of the display unit 14. The threaded portions 96 and the fingers 98 are positioned equidistant from each other, with a small space provided in between adjacently positioned threaded portions and fingers. The threaded portions 96 create the opening 72 and provide the threaded connection of the speed nut 64 to the threaded surface 62 of the cylindrical formation 30 of the display unit 14. The centering action of the fingers 98 ensures that the teeth provided at the threaded ends 100 of the threaded portions 96 of the speed nut 64 are loaded equally when the speed nut is tightened. The fingers 98 also provide mechanical support and stability in case one of the threaded portions fail or are otherwise compromised.

The threaded portions 96 and the fingers 98 further enable the cylindrical formation 30 of the display unit 14 to be inserted into the speed nut 64 to a position in which the threaded portions fully or nearly fully engage the threaded surface 62 of the cylindrical formation to secure the display unit in place. During assembly, the operator inserts the cylindrical formation 30 of the display unit 14 through the opening 26 of the panel 16 and into the central opening 72 of the speed nut 64 of the gear mechanism 60 of the adapter plate 40. The threaded surface 62 of the cylindrical formation 30 ratchet over the threaded ends 100 of the threaded portions 96 of the speed nut 64 until the display unit 14 is flush against the panel 16, with the interlocked threads holding the display unit in place.

Once positioned, the release gear 66 may be rotated by the operator in a direction to achieve a final tightening of the speed nut 64 to fully secure the display unit 14 to the adapter 40. The teeth of the release gear 66 provide a suitable surface for the person rotating the release gear to manipulate during rotation. Thus, the display unit 14 can be attached to the adapter 40 by applying a force to the display unit when inserting the cylindrical formation 30 into the opening 72 of the speed nut 64. The spaces between the threaded portions 96 and the fingers 98 enable the threaded portions to flex a certain amount to enable the threaded surface 62 of the cylindrical formation 30 and the threaded ends 100 of the threaded portions of the speed nut 64 to move past one another. The person installing the display unit 14 does not need to thread the display unit into the threaded portions 96 of the speed nut to secure the display unit, but need only manipulate the release gear 66 a relatively shorter amount of time to eliminate any relative movement between the speed nut and the cylindrical formation 30 of the display unit.

Figure 9:
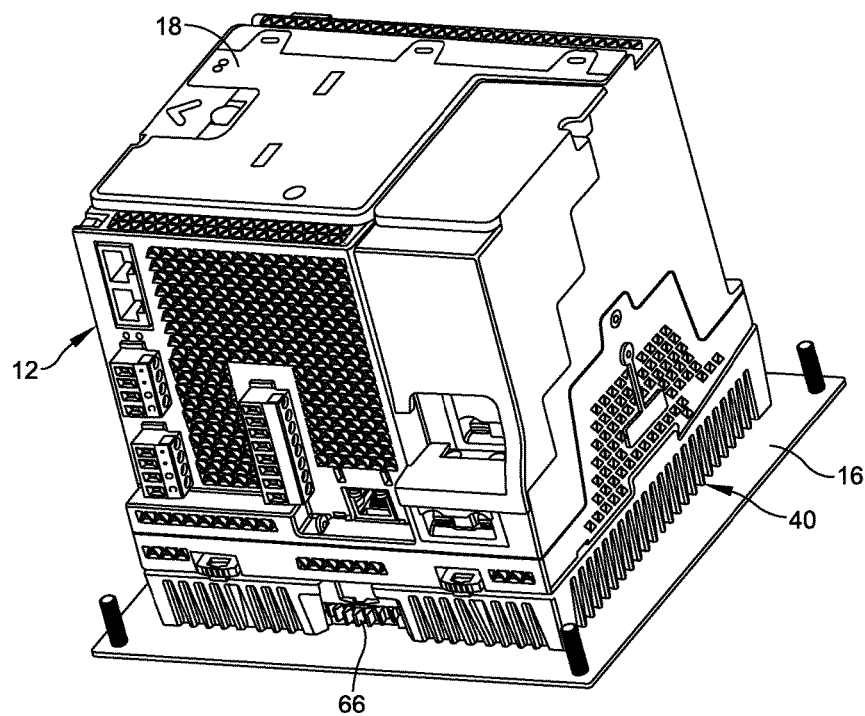
FIG. 9 is a back perspective view of the adapter assembly and the meter base unit.
Figure 10:
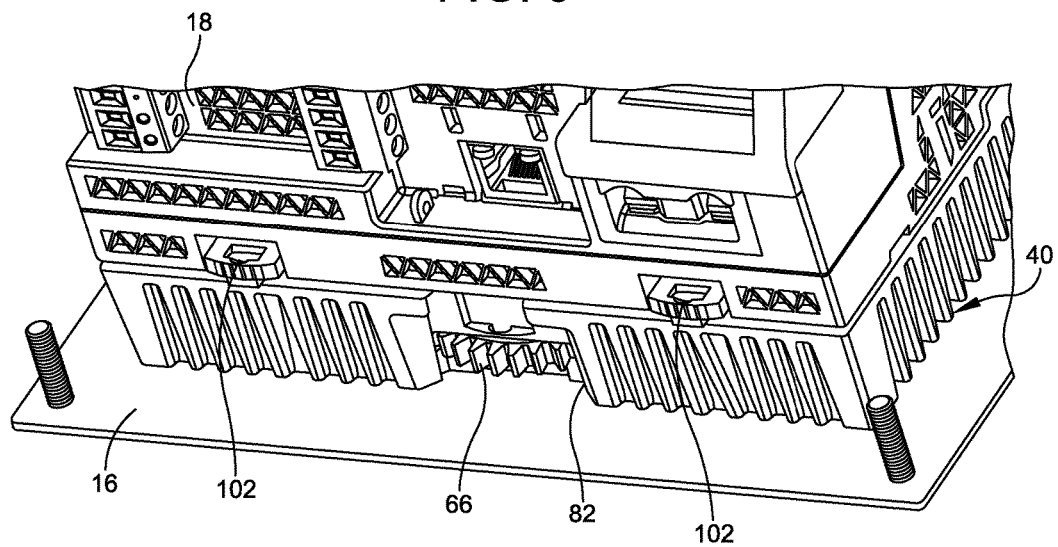
FIG. 10 is an enlarged perspective view of a portion of the adapter assembly and the meter base unit showing sealing points of the assembly.

Referring to FIGS. 9 and 10, it is shown that the release gear 66 is accessible from the base unit side of the panel via the aperture 82. As mentioned above, the release gear 66 is used to firmly secure the display unit to the adapter 40 after the cylindrical formation 30 of the display unit 14 is inserted into the speed nut 64 in a position in which the threaded surface 62 of the cylindrical formation are nearly fully threaded with respect to the threads of the speed nut. The release gear 66 is accessed on the side of the adapter 40 having the base unit 12, and can be manipulated by the operator's fingers to tighten the display unit 14. In one embodiment, the release gear 66 is rotated in a counter-clockwise direction to rotate the speed nut 64 in a clockwise direction, thereby tightening the display unit 14. To release the display unit 14, the release gear 66 is rotated in a clockwise direction to rotate the speed nut 64 in a counter-clockwise direction to loosen the display unit.

As shown in FIG. 10, the adapter 40 includes sealing points, each indicated at 102, which seal the meter base unit 12 to the adapter 40 thereby enabling the base unit 12, the adapter 40, the panel 16, and the display unit 14 to be sealed for the purposes of revenue metering. In one embodiment, another sealing point associated with the release gear 66 may be provided to enable the remote display to be sealed to the adaptor 40 since the release gear can no longer be manipulated, and thus to the panel 16. When combined with sealing points 102, the entire assembly (meter base unit 12, adaptor 40, panel 16 and remote display unit 14) is sealed as one unit, for revenue metering applications. The assembly 10 further includes the cable 34 (FIGS. 2 and 3) connecting the display unit 14 to the base unit 12 that may be routed through a recess in the adapter 40 to allow the connection to occur without exposing the cable, which may be advantageous for the purpose of revenue sealing of the complete unit.

In some embodiments, the adapter assembly can be configured to be integrally provided on the base unit. As mentioned above, the gear mechanism can employ a worm gear or tool could be used to directly drive the speed nut.

Wedges can be used to tighten the speed nut, so that rotation is only required for removal. The speed nut can be replaced with a non-rotating ratcheting mechanism, with a second mechanism to release the ratchet, for display removal. Snaps or catches could be used to secure the display, with an optional release mechanism to aid and speed the release of the display for removal.

While particular aspects and implementations of the present disclosure have been illustrated and described, it is to be understood that the present disclosure is not limited to the precise construction and compositions disclosed herein and that various modifications, changes, and variations are not only contemplated but also apparent from the foregoing descriptions without departing from the scope of the present disclosure as defined in the appended claims.

What is claimed is:

1. An adapter assembly used to secure a base unit and a display unit to a panel, the adapter assembly comprising:
    a base unit including a housing;
    a display unit including a body;
    a panel including an opening; and
    an adapter disposed between the base unit and the panel, the adapter including a primary wall,
    wherein one of the display unit and the adapter includes a formation that extends from the body of the display unit or the primary wall of the adapter, and the other of the display unit and the adapter includes a mechanism configured to engage and secure the display unit to the panel without disturbing a securement of the base unit to the adapter.

2. The adapter assembly of claim 1, wherein the formation includes a cylindrical formation extending from the body of the display unit.

3. The adapter assembly of claim 2, wherein the mechanism includes a speed nut.

4. The adapter assembly of claim 3, wherein the mechanism includes a gear mechanism associated with the adapter, the gear mechanism including a release gear that engages the speed nut.

5. The adapter assembly of claim 4, wherein the speed nut includes a circular body having an inner hub with a large central opening and an outer periphery having teeth formed thereon.

6. The adapter assembly of claim 5, wherein the cylindrical formation includes a threaded outer surface to threadably engage the gear mechanism to secure the display unit to the adapter.

7. The adapter assembly of claim 6, wherein the release gear includes a body having a centrally located opening formed in the body and teeth formed on an outer periphery of the body that mesh with the teeth of the speed nut to drive the rotation of the speed nut when the release gear is rotated.

8. The adapter assembly of claim 7, wherein the release gear extends through an aperture formed in a side wall of the adapter to enable access of the release gear.

9. The adapter assembly of claim 6, wherein the body of the speed nut further includes a plurality of inwardly projecting threaded portions and a plurality of inwardly projecting fingers positioned between the threaded portions.

10. The adapter assembly of claim 9, wherein each threaded portion of the plurality of threaded portions includes a threaded end that threadably engages the threaded cylindrical formation, and wherein the plurality of threaded portions and the plurality of fingers are positioned equidistant from each other, with a small space provided in between an adjacently positioned threaded portion and finger.

11. The adapter assembly of claim 10, wherein the threaded portions and the fingers further enable the cylindrical formation of the display unit to be inserted into the speed nut to a position in which the threaded portions fully or nearly fully engage the threads of the speed nut to secure the display unit in place.

12. The adapter assembly of claim 3, wherein the adapter includes an anti-rotation pin on the adapter that is received within an opening formed in the display unit to align the display unit on the panel and prevent the display unit from rotating when the speed nut is tightened.

* * * * *